United States Patent [19]
Tanba

[11] Patent Number: 6,101,890
[45] Date of Patent: Aug. 15, 2000

[54] GEAR SHIFTING APPARATUS

[75] Inventor: Toshio Tanba, Kariya, Japan

[73] Assignee: Aisin AI Co., Ltd., Nishio, Japan

[21] Appl. No.: 09/218,622

[22] Filed: Dec. 22, 1998

[30] Foreign Application Priority Data

Apr. 10, 1998 [JP] Japan ................................. 10-099322

[51] Int. Cl.⁷ ................................................. F16H 63/30
[52] U.S. Cl. ........................................... 74/355; 74/473.1
[58] Field of Search ................................. 74/335, 473.1, 74/473.25

[56] References Cited

U.S. PATENT DOCUMENTS

| | | | |
|---|---|---|---|
| 4,920,815 | 5/1990 | Reynolds | 74/473.1 X |
| 5,105,674 | 4/1992 | Rea et al. | 74/473.1 X |
| 5,309,782 | 5/1994 | Seaman | 44/335 X |

Primary Examiner—Sherry L. Estremsky
Attorney, Agent, or Firm—Burns, Doane, Swecker & Mathis, LLP

[57] ABSTRACT

A gear shifting apparatus includes a fork shaft, a plurality of shift forks, an operation lever, a received member, a receiving member and a groove. The received member is fastened on the fork shaft. The receiving member is disposed in a housing, and slidably receives an end of the received member. The groove is formed in one of the received member and the receiving member, and engages with the other one of the received member and the receiving member so as to define the movement of the fork shaft in the selecting direction. Thus, the shift forks can be slid smoothly on the fork shaft, because no load is applied to the shift forks in the selecting direction which results in the torsion between the shift forks and the fork shaft and finally in the excessive sliding resistance therebetween.

7 Claims, 3 Drawing Sheets

GEAR SHIFTING APPARATUS

BACKGROUND OF THE INVENTION

1. Field of the Invention

The present invention relates to a gear shifting apparatus for vehicle transmissions.

2. Description of the Related Art

There is a so-called single rail gear shifting apparatus, one type of gear shifting apparatuses. The single rail gear shifting apparatus is provided with a fork shaft, a plurality of shift forks and an operation lever. The fork shaft is held in a housing slidably in an axial direction of the housing and rotatably in a peripheral direction thereof. The shift forks are disposed on the fork shaft, and are fitted with the fork shaft slidably in an axial direction of the fork shaft. The operation lever is connected with the fork shaft.

In the single rail gear shifting apparatus, the operation lever is operated in a selecting direction to rotate the fork shaft in the peripheral direction of the housing so as to selectively engage an inner lever, which is disposed on the fork shaft, with one of the shift forks, and is operated in a shifting direction to slide the fork shaft in the axial direction of the housing so as to move one of the shift forks engaged with the inner lever, thereby carrying out gear shifting by thus operating the fork shaft.

When the operation lever carries out the selecting operation in the single rail gear shifting apparatus, the inner lever disposed on the fork shaft engages with an engagement cavity formed in a fork rod of one of the shift forks. If there arises a deviation between the inner lever and the engagement cavity of the fork rod, a load is applied to a fork head of the shift fork in the selecting direction. Consequently, there arises a torsion between the shift fork and the fork shaft. The torsion results in an excessive sliding resistance between the shift fork and the fork shaft. As a result, there may arise a fear for inhibiting the shift fork from moving smoothly on the fork shaft.

Moreover, in the single rail gear shifting apparatus, the operation lever is connected with the fork shaft by way of a head of a connector. The connector is fastened onto the fork shaft, and the head of the connector is connected rotatably with the leading end of the operation lever. In view of the manufacturing cost, it is preferable to employ a less expensive split pin as means for connecting the connector with the fork shaft. However, the operation lever applies an excessive selecting load to the position where the connector is fastened to the fork shaft. Accordingly, when a split pin is employed as means for connecting the connector with the fork shaft, the split pin might come out or break. Therefore, instead of the split pin which is less expensive as fixing means, a spline connection must be employed in such a connection. Compared to the split pin, the spline connection is more expensive.

In addition, in the single rail gear shifting apparatus, gaps are usually present between the constituent members in the selecting direction. Consequently, the vibrations of the operation lever may be transmitted to the constituent members by way of the fork shaft. As a result, there may arise a fear in that the constituent members may interfere with each other to generate hitting sounds.

SUMMARY OF THE INVENTION

It is therefore an object of the present invention to cope with the problems associated with the conventional single rail gear shifting apparatus.

The present invention relates to a gear shifting apparatus. In an aspect of the present invention, a gear shifting apparatus according to the present invention comprises:

a fork shaft held in a housing slidably in an axial direction of the housing and rotatably in a peripheral direction thereof, and having an inner lever disposed thereon;

a plurality of shift forks disposed on the fork shaft, and being fitted with the fork shaft slidably in an axial direction of the fork shaft;

an operation lever connected with the fork shaft, being operable in a selecting direction to rotate the fork shaft in the peripheral direction so as to selectively engage the inner lever with one of the shift forks, and being operable in a shifting direction to slide the fork shaft in the axial direction so as to move one of the shift forks engaged with the inner lever, thereby carrying out gear shifting by thus operating the fork shaft;

a received member disposed on the fork shaft, and fitted therewith to fasten thereto;

a receiving member disposed in the housing, and slidably receiving an end of the received member; and a groove formed in one of the received member and the receiving member, the groove engaging with the other one of the received member and the receiving member so as to define the movement of the fork shaft in the selecting direction.

In a further aspect of the present invention, the received member can have a connector. The connector projects oppositely with respect to the end, is fastened onto the fork shaft by way of a split pin, and has a head connected rotatably with the operation lever.

In a further aspect of the present invention, the groove can be formed in the end of the received member; and the receiving member can be formed as a pin-like configuration, can be assembled with the housing advanceable and retractable with respect to the end of the received member, and can be brought into resilient contact with a bottom of the groove of the received member.

In the present gear shifting apparatus, the fork shaft is rotated in the peripheral direction by operating the operation lever in the selecting direction so that the selecting operation can be carried out; and the fork shaft is slid in the axial direction by operating the operation lever in the shifting direction so that the shifting operation can be carried out.

In the present gear shifting apparatus, when the gear shifting operation is carried out by the operation lever, the receiving member moves in the groove formed, for example, in the end of the received member relatively with respect to the receiving member, thereby enabling a driver to carry out the selecting operation. Specifically, the cooperative action between the groove and the receiving member defines the movement of the fork shaft in the selecting direction. Thus, the fork shaft is regulated so that it rotates precisely at the designed position to carry out the operation in the selecting direction.

Therefore, when the inner lever of the fork shaft is engaged with the engagement cavity of the fork rod of one of the shift forks by operating the operation lever in the selecting direction, no load is applied to the fork rod of one of the shift forks, which is engaged with the inner lever, in the selecting direction. Accordingly, no torsion arises between the shift forks and the fork shaft, torsion which results from the load acting in the selecting direction. As a result, it is possible to inhibit the excessive sliding resistance from arising between the shift forks and the fork shaft. Thus, it is possible to securely slide the shift forks smoothly on the fork shaft relatively with respect to the fork shaft.

Moreover, in the present gear shifting apparatus, the operation lever is connected with the received member which is disposed on the fork shaft. Consequently, the received member and receiving member receive the selecting-direction load which arises when the operation lever is operated in the selecting direction. Therefore, the selecting-direction load hardly acts to the fastening portion of the received member with respect to the fork shaft. Note that, at the fastening portion, the operation lever is connected with the fork shaft. As a result, when a split pin is employed as means for fastening the received member with respect to the fork shaft, there arises no fear in that the spilt pin receives the selecting-direction load to come out or fracture. Thus, it is possible to employ an inexpensive split pin as the fastening means without any trouble.

In addition, in the present gear shifting apparatus, the receiving member can be brought into resilient contact with the bottom of the groove which is formed, for example, in the end of the received member. Accordingly, no gap is present between the bottom of the groove and the receiving member. As a result, no hitting sound is generated between the received member and the receiving member.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Preferred Embodiment

Figure 1:
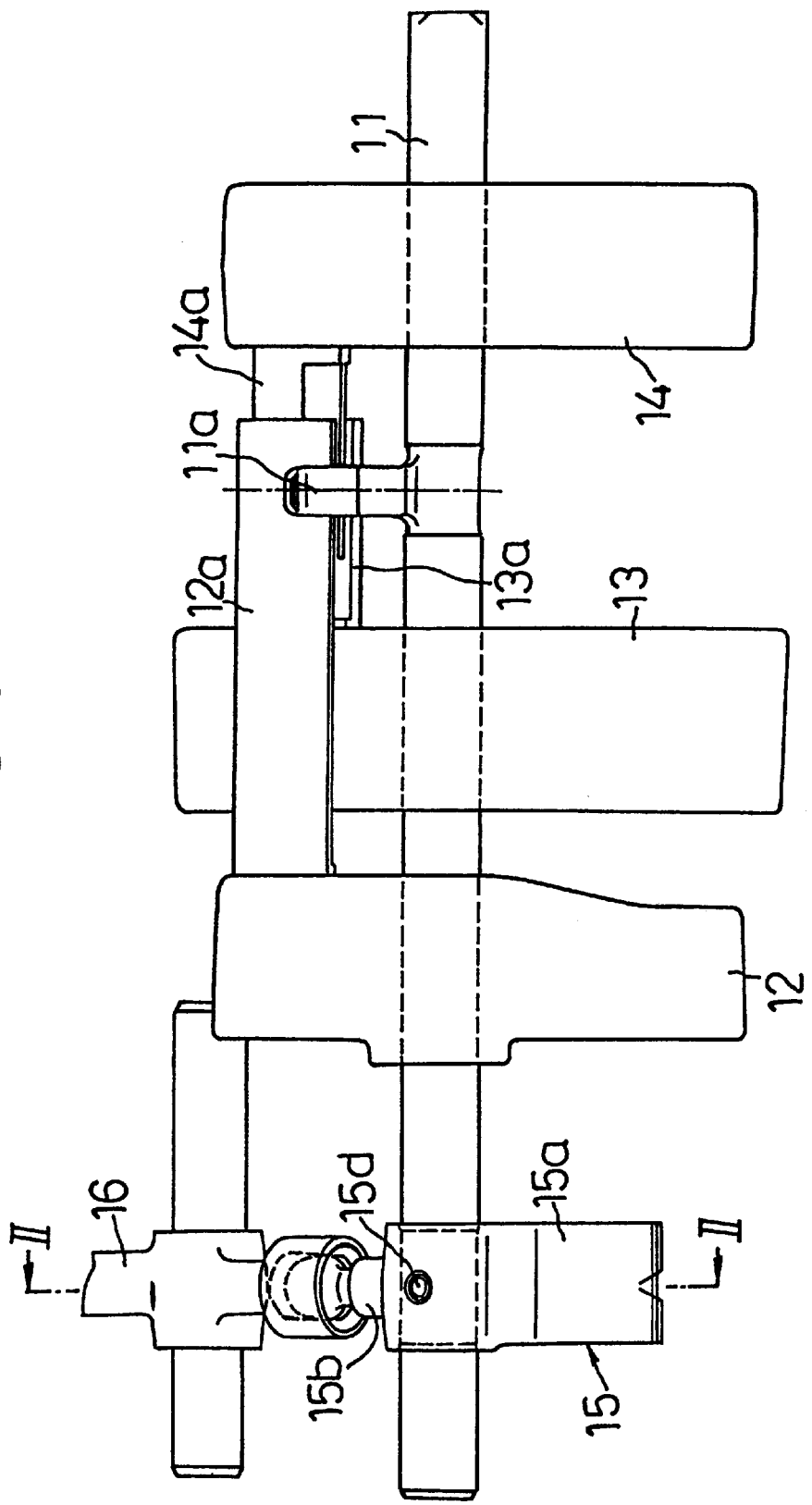
FIG. 1 is a partly-abbreviated side view of a gear shifting apparatus according to a Preferred Embodiment of the present invention.
Figure 2:
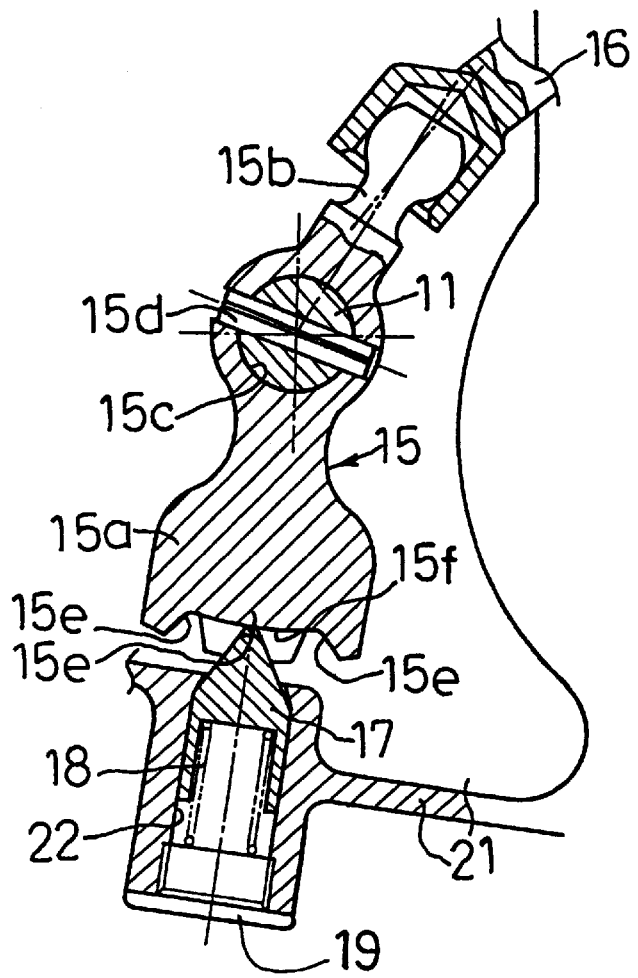
FIG. 2 is a cross-sectional view of the gear shifting apparatus taken in the direction of the arrow II—II of FIG. 1.

A Preferred Embodiment of the present invention will be hereinafter described with reference to the accompanying drawings. FIGS. 1 and 2 illustrate a gear shifting apparatus according to the Preferred Embodiment. The gear shifting apparatus is a single rail gear shifting apparatus. As illustrated in FIG. 1, a fork shaft 11 is fitted into shift forks 12, 13 and 14. The shift forks 12, 13 and 14 can slide on the fork shaft 11 in the axial direction. An inner lever 11a is disposed on the fork shaft 11, and is formed integrally therewith. Moreover, a housing shift lever 15 is fastened onto the fork shaft 11, and an operation lever 16 is connected with the fork shaft 11 by way of the housing shift lever 15.

As illustrated in FIG. 1, the housing shift lever 15 includes a lever body 15a and a connector 15b. The connector 15b is disposed at one of the opposite ends of the lever body 15a, and is formed integrally therewith. As illustrated in FIG. 2, the housing shift lever 15 is provided with a through hole 15c into which the fork shaft 11 is fitted. The housing shift lever 15 is fastened onto the fork shaft 11 by way of a split pin 15d while the housing shift lever 15 is fitted around the fork shaft 11. The operation lever 16 is connected rotatably with a head of the connector 15b of the thus fastened housing shift lever 15.

As illustrated in FIG. 1, the inner lever 11a is formed integrally with the fork shaft 11, and projects sidewise perpendicularly with respect to the fork shaft 11. Further, the inner lever 11a faces fork rods 12a, 13a and 14a which extend from the shift forks 12, 13 and 14 parallelly along the fork shaft 11. Furthermore, the inner lever 11a rotates integrally with the fork shaft 11 when the fork shaft 11 rotates in the peripheral direction. When the inner lever 11a rotates, the inner lever 11a selectively engages with one of engagement cavities of the fork rods 12a, 13a and 14a. When the fork shaft 11 slides, the inner lever 11a selectively slides one of the shift forks 12, 13 and 14 in the axial direction by way of one of the fork rods 12a, 13a and 14a which is engaged with the inner lever 11a. The fork shaft 11 is rotated in the peripheral direction by operating the operation lever 16 in the selecting direction, and is slid in the axial direction by operating the operation lever 16 in the shifting direction.

Figure 3:
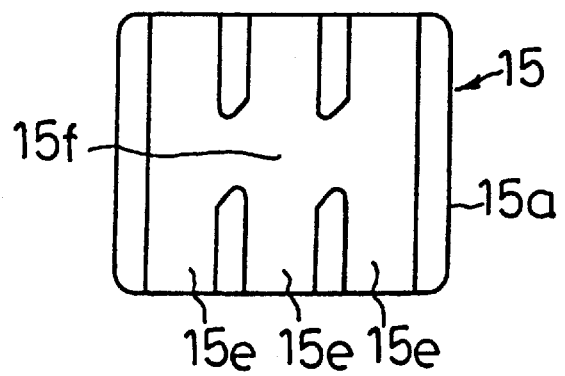
FIG. 3 is a plan view for illustrating a lower-end surface of a housing shift lever which constitutes the gear shifting apparatus.

As illustrated in FIGS. 2 and 3, on a lower-end surface of the lever body 15a in the housing shift lever 15, there are formed a plurality of lateral grooves 15e and a longitudinal groove 15f. The lateral grooves 15e extend in the axial direction of the fork shaft 11. The longitudinal groove 15f connects the lateral grooves 15e at the middle of the lateral grooves 15e. The lateral grooves 15e enable the fork shaft 11 to move in the shifting directions, and the longitudinal groove 15f enables the fork shaft 11 to move in the selecting direction. By cooperating with a receiving pin 17 described later, the longitudinal groove 15f defines the movement of the fork shaft 11 in the selecting direction, and the lateral grooves 15e enable the fork shaft 11 to move in the shifting directions.

As illustrated in FIG. 2, the receiving pin 17 is urged by a spring 18 so that it is brought into resilient contact with a grooved bottom, the lower-end surface of the lever body 15a in the housing shift lever 15. The receiving pin 17 is assembled in an installation hole 22, which is formed in a transmission housing 21 of a transmission, together with the spring 18. The receiving pin 17 is formed as a cylinder shape which has a cone-shaped head. The receiving pin 17 is installed in the installation hole 22 so that it can advance and retract with respect to the lower-end surface of the lever body 15a of the housing shift lever 15. The spring 18 is also assembled in the installation hole 22, and is held by a plug 19. Thus, the receiving pin 17 is brought into resilient contact with the lower-end surface of the lever body 15a of the housing shift lever 15 by the urging force of the spring 18.

In the thus constructed gear shifting apparatus, the fork shaft 11 is rotated in the peripheral direction by operating the operation lever 16 in the selecting direction so that the selecting operation can be carried; and the fork shaft 11 is slid in the axial direction by operating the operation lever 16 in the shifting direction so that the shifting operation can be carried out.

In the gear shifting apparatus, when the operation lever 11 is operated in the selecting direction, the fork shaft 11 is rotated in the peripheral direction. Then, depending on the rotary direction and rotation angle of the fork shaft 11, the inner lever 11a selectively engages with one of the engagement cavities of the fork rods 12a, 13a and 14a of the shift forks 12, 13 and 14. Under the circumstances, when the operation lever 11 is operated in the shifting direction, the fork shaft 11 slides in the axial direction. Then, the inner lever 11a selectively slides one of the shift forks 12, 13 and 14 in the axial direction by way of one of the fork rods 12a, 13a and 14a which is engaged with the inner lever 11a. Thus, it is possible to carry out a desired gear shifting operation.

Particularly, in the gear shifting apparatus, when the gear shifting operation is carried out by the operation lever 16, the receiving pin 17 moves in the longitudinal groove 15f, which is formed in the lower-end surface of the lever body 15a in the housing shift lever 15, relatively with respect to the housing shift lever 15. The relative movement of the receiving pin 17 thereby enables a driver to carry out the selecting operation. Thus, the cooperative action between the longitudinal groove 15f and the receiving pin 17 defines the movement of the fork shaft 11 in the selecting direction. As a result, the fork shaft 11 is regulated so that it rotates precisely at the designed position to carry out the operation in the selecting direction.

Therefore, when the inner lever 11a of the fork shaft 11 is engaged with one of the engagement cavities of the fork rods 12a, 13a and 14a of the fork shafts 12, 13 and 14 by operating the operation lever 16 in the selecting direction, no load is applied to one of the fork rods 12a, 13a and 14a of the shift forks 12, 13 and 14 in the selecting direction. Accordingly, no torsion arises between one of the fork rods 12a, 13a and 14a of the shift forks 12, 13 and 14 and the fork shaft 11, torsion which results from the load acting in the selecting direction. As a result, it is possible to inhibit the excessive sliding resistance from arising between the fork rods 12a, 13a and 14a of the shift forks 12, 13 and 14 and the fork shaft 11. Thus, it is possible to securely slide the shift forks 12, 13 and 14 smoothly on the fork shaft 11 relatively with respect to the fork shaft 11.

Moreover, the operation lever 16 is connected with the housing shift lever 15 which is disposed on the fork shaft 11. Consequently, the housing shift lever 15 and the receiving pin 17 receive the selecting-direction load which arises when the operation lever 16 is operated in the selecting direction. Therefore, the selecting-direction load hardly acts to the fastening portion of the housing shift lever 15 with respect to the fork shaft 11. Note that, at the fastening portion, the operation lever 16 is connected with the fork shaft 11. As a result, when the split pin 15d is employed as means for fastening the housing shift lever 15 with respect to the fork shaft 11, there arises no fear in that the spilt pin 15 receives the selecting-direction load to come out or fracture. Thus, it is possible to employ the inexpensive split pin 15d as the fastening means without any trouble.

In addition, in the gear shifting apparatus, the receiving pin 17 is brought into resilient contact with the bottom of the lateral grooves 15e and longitudinal groove 15f by the spring 18. Note that the lateral grooves 15e and longitudinal groove 15f are formed in the lower-end surface of the lever body 15a in the housing shift lever 15. Accordingly, no gap is present between the lower-end surface of the lever body 15a of the housing shift lever 15 and the receiving pin 17. As a result, no hitting sound generates between the housing shift lever 15 and the receiving pin 18.

Modified Version

Figure 4:
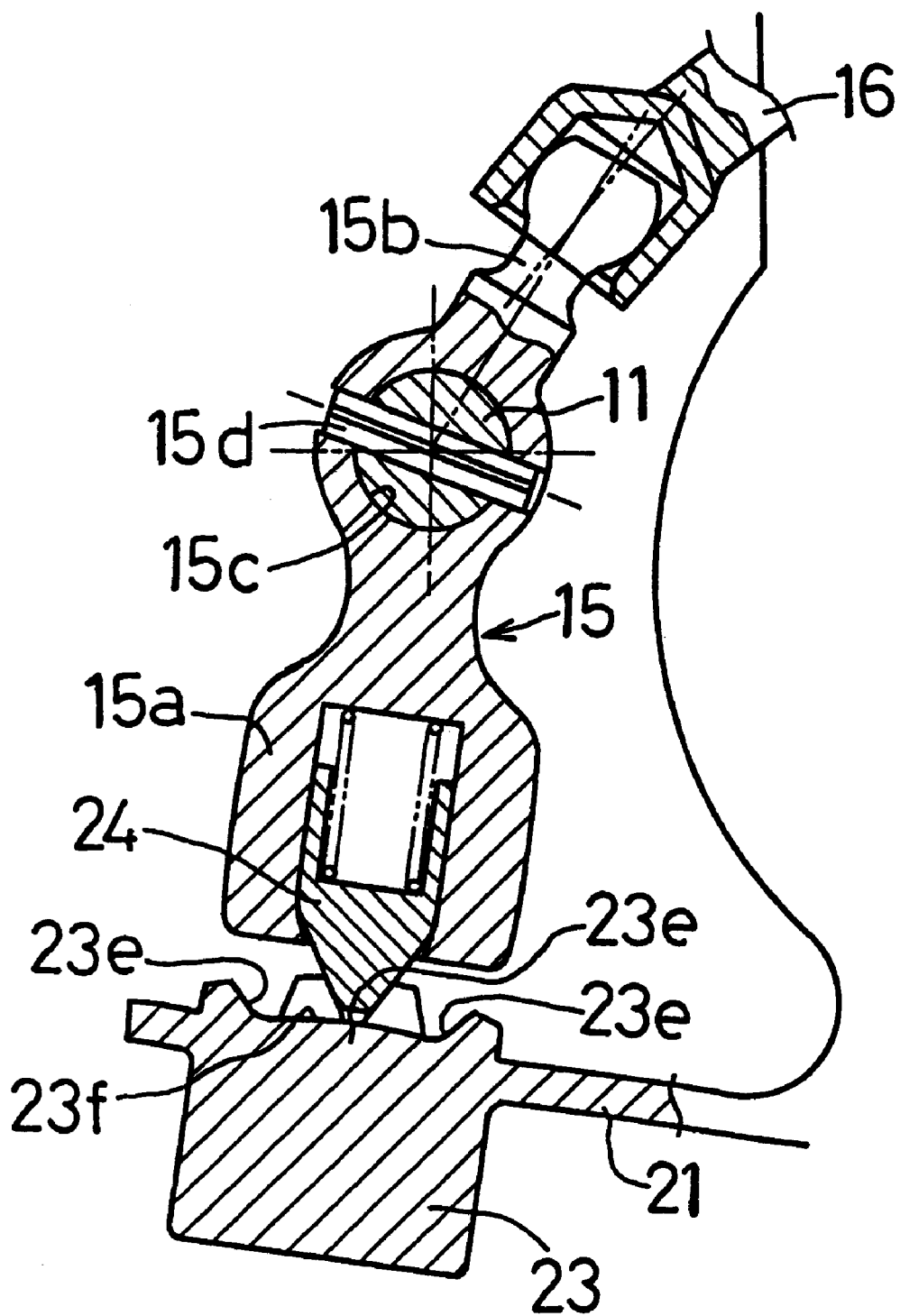
FIG. 4 is a cross-sectional view of a modified version of the gear shifting apparatus taken in the direction similar to FIG. 2.

FIG. 4 illustrates a modified version of the gear shifting apparatus according to the Preferred Embodiment. As illustrated in the drawing, a receiving portion 23 is formed in the transmission housing 21. In an upper-end surface of the receiving portion 23, there are formed a plurality of lateral grooves 23e and a longitudinal groove 23f which are arranged similarly to the lateral grooves 15e and longitudinal groove 15f of the Preferred Embodiment. In the lever body 15a of the housing shift lever 15, there is disposed a received pin 24. In the same fashion as the receiving pin 17 of the Preferred Embodiment, the received pin 24 advances and retracts with respect to the upper-end surface of the receiving portion 23, and is brought into resilient contact with the bottom of the lateral grooves 23e and longitudinal groove 23f. Hence, it is apparent that the modified version operates and produces the advantages in the same manner as the Preferred Embodiment.

Having now fully described the present invention, it will be apparent to one of ordinary skill in the art that many changes and modifications can be made thereto without departing from the spirit or scope of the present invention as set forth herein including the appended claims.

What is claimed is:

1. A gear shifting apparatus, comprising:
   a fork shaft held in a housing, said fork shaft being slidable in an axial direction of said housing and being rotatable, and an inner lever disposed on the fork shaft;
   a plurality of shift forks slidably disposed on said fork shaft, in an axial direction of said fork shaft;
   an operation lever connected with said fork shaft, said operation lever being operable in a selecting direction to rotate said fork shaft in the peripheral direction so as to selectively engage the inner lever with one of said shift forks, and being operable in a shifting direction to slide said fork shaft in the axial direction so as to move said one of said shift forks engaged with the inner lever, thereby carrying out gear shifting by thus operating said fork shaft;
   a received member disposed on and fastened to said fork shaft, said received member having a connector projecting oppositely with respect to a lower end of the received member, said connector being fastened onto said fork shaft by a split pin, said received member having a head connected rotatably with said operation lever;
   a receiving member disposed in the housing and slidably receiving an end of said received member; and
   a groove formed in one of said received member and said receiving member, the groove engaging with the other one of said received member and said receiving member so as to define the movement of said fork shaft in the selecting direction.

2. The gear shifting apparatus according to claim 1, wherein said groove is formed in a lower end of said received member; and
   said receiving member has a pin-shaped configuration, said receiving member being advanceable and retractable with respect to the lower end of said received member, and being in resilient contact with a bottom of said groove of said received member.

3. The gear shifting apparatus according to claim 1, wherein said received member is a housing shift lever disposed in the housing; and
   said operation lever is connected with said fork shaft through the housing shift lever.

4. The gear shifting apparatus according to claim 1, wherein said groove includes a plurality of lateral grooves extending in the axial direction of said fork shaft, and including a longitudinal groove connecting the lateral grooves at a middle portion of the lateral grooves.

5. A gear shifting apparatus, comprising:

a fork shaft held in a housing, said fork shaft being slidable in an axial direction of said housing and being rotatable, and an inner lever disposed on the fork shaft;

a plurality of shift forks disposed on said fork shaft for slidable movement in an axial direction of said fork shaft;

an operation lever connected with said fork shaft, said operation lever being operable in a selecting direction to rotate said fork shaft to selectively engage the inner lever with one of said shift forks, and being operable in a shifting direction to slide said fork shaft in the axial direction to move said one of said shift forks engaged with the inner lever, thereby carrying out gear shifting by thus operating said fork shaft;

a received member disposed on and fastened to said fork shaft;

a receiving member disposed in the housing and slidably receiving an end of said received member;

a groove formed in a lower end of said received member, the groove engaging the receiving member to define the movement of said fork shaft in the selecting direction; and said receiving member having a pin-shaped configuration, said receiving member being advanceable and retractable with respect to the lower end of said received member, and being in resilient contact with a bottom of said groove of said received member.

6. The gear shifting apparatus according to claim 5, wherein said received member is a housing shift lever disposed in the housing; and said operation lever is connected with said fork shaft through the housing shift lever.

7. The gear shifting apparatus according to claim 5, wherein said groove includes a plurality of lateral grooves extending in the axial direction of said fork shaft, and including a longitudinal groove connecting the lateral grooves at a middle portion of the lateral grooves.

* * * * *